Dec. 13, 1949 J. R. HORTON 2,491,109
CONTROL UNIT FOR TURBOPOWER TRANSMISSION APPARATUS
Filed April 16, 1946 3 Sheets-Sheet 1

INVENTOR.
Joseph R. Horton
BY *Victor J. Evans & Co.*
ATTORNEYS

Dec. 13, 1949   J. R. HORTON   2,491,109
CONTROL UNIT FOR TURBOPOWER TRANSMISSION APPARATUS
Filed April 16, 1946   3 Sheets-Sheet 2
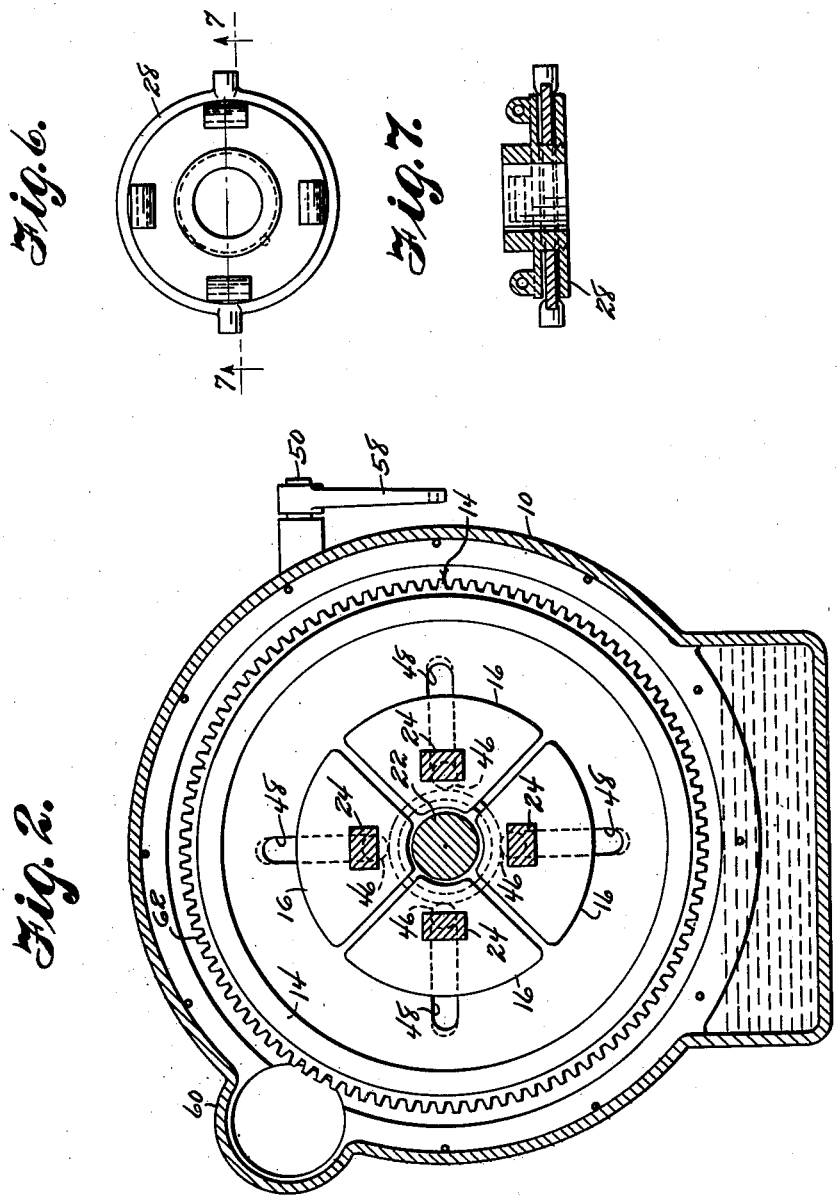
INVENTOR.
Joseph R. Horton
BY
ATTORNEYS Dec. 13, 1949 J. R. HORTON 2,491,109
CONTROL UNIT FOR TURBOPOWER TRANSMISSION APPARATUS
Filed April 16, 1946 3 Sheets-Sheet 3
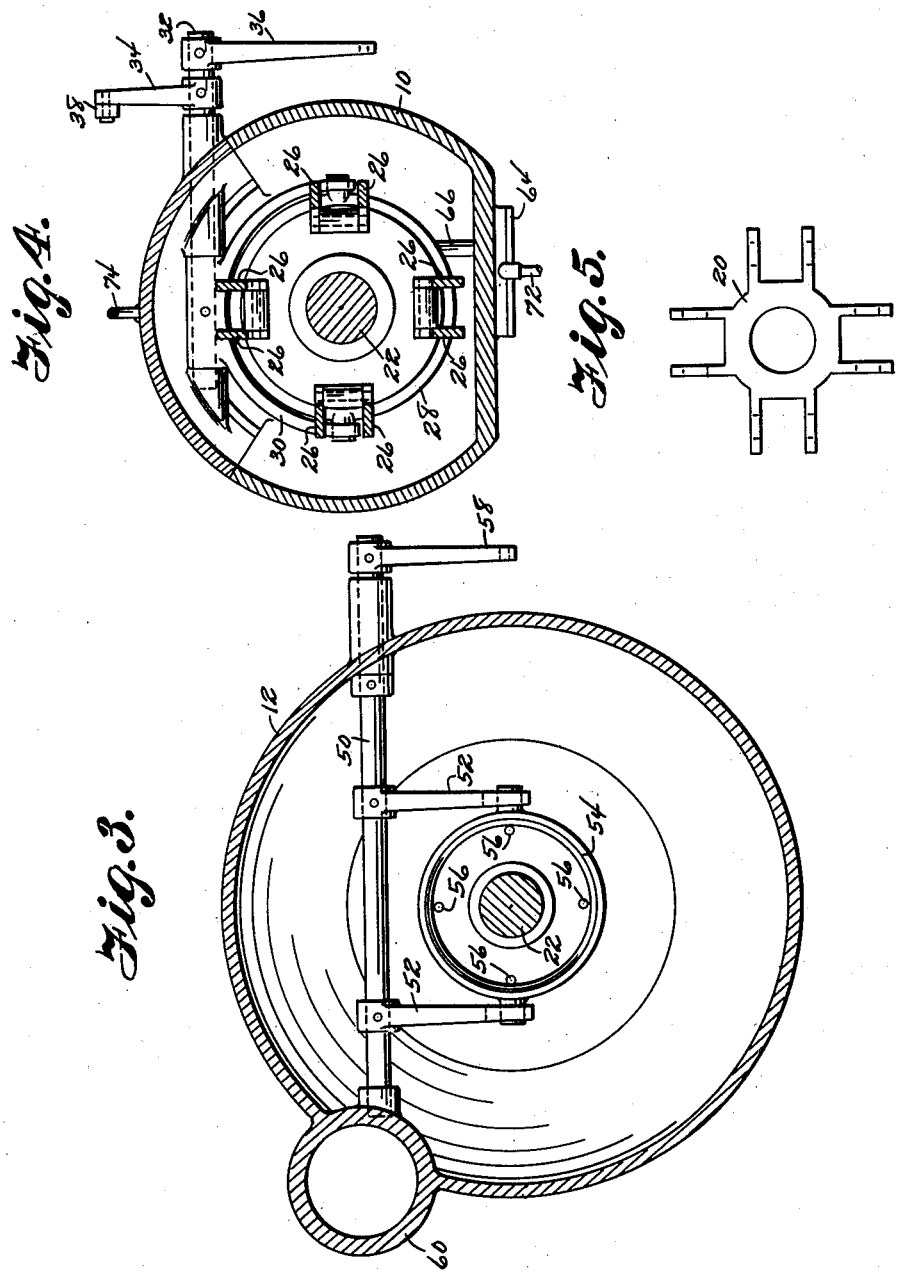
INVENTOR.
Joseph R. Horton
BY Victor J. Evans & Co.
ATTORNEYS Patented Dec. 13, 1949

2,491,109

UNITED STATES PATENT OFFICE 2,491,109

CONTROL UNIT FOR TURBOPOWER TRANSMISSION APPARATUS

Joseph R. Horton, Knoxville, Tenn.

Application April 16, 1946, Serial No. 662,560

1 Claim. (Cl. 264—15)

This invention relates to a control unit for turbo-power transmission apparatus and more particularly to a speed responsive means employing centrifugal force generated by self-contained governor weights to adjust the blade settings of an adjustable bladed turbine wheel device adapted for the transmission of power from an engine or other source of power to a load.

An object of the invention is to provide a device that eliminates gear shifting that permits the engine to operate under ideal load conditions, that is smooth in action and silent at all times and will replace the conventional clutch at a cost practically similar in manufacture and installation.

A further object of this invention is to provide a device which will be formed of a few strong, simple and durable parts that is inexpensive to manufacture and will not easily get out of order.

A still further object of the invention is to provide a speed responsive unit which offers complete control of the blade settings of an adjustable bladed turbine wheel device, adapted for the transmission of power from an engine to a load.

By adjustment of the blade settings of the turbine wheel device, the unit offers automatic adjustment of the load which is placed upon the engine to which it is attached.

The desired load upon the engine can be selected by the manufacturer and adjustment so made at the factory that it is impossible for the operator to exceed this load.

With the above and other objects in view the invention consists of certain novel details of construction and combinations of parts hereinafter more fully described and claimed, it being understood that various modifications may be resorted to within the scope of the appended claim without departing from the spirit or sacrificing any of the advantages of the invention.

In the accompanying drawings forming a part of this specification:

Figure 2 is a cross sectional view taken on the line 2—2 of Figure 1 looking in the direction of the arrows;

Figure 3 is a cross sectional view taken on the line 3—3 of Figure 1 looking in the direction of the arrows;

Figure 4 is a cross sectional view taken on the line 4—4 of Figure 1, looking in the direction of the arrows;

Figure 5 is a front elevation of the pronged collar which carries the governor weights;

Figure 6 is a front elevation of the control collar shown in Figure 4 and

Figure 7 is a cross sectional view on the line 7—7 of Figure 6 looking in the direction of the arrows.

Figure 1:
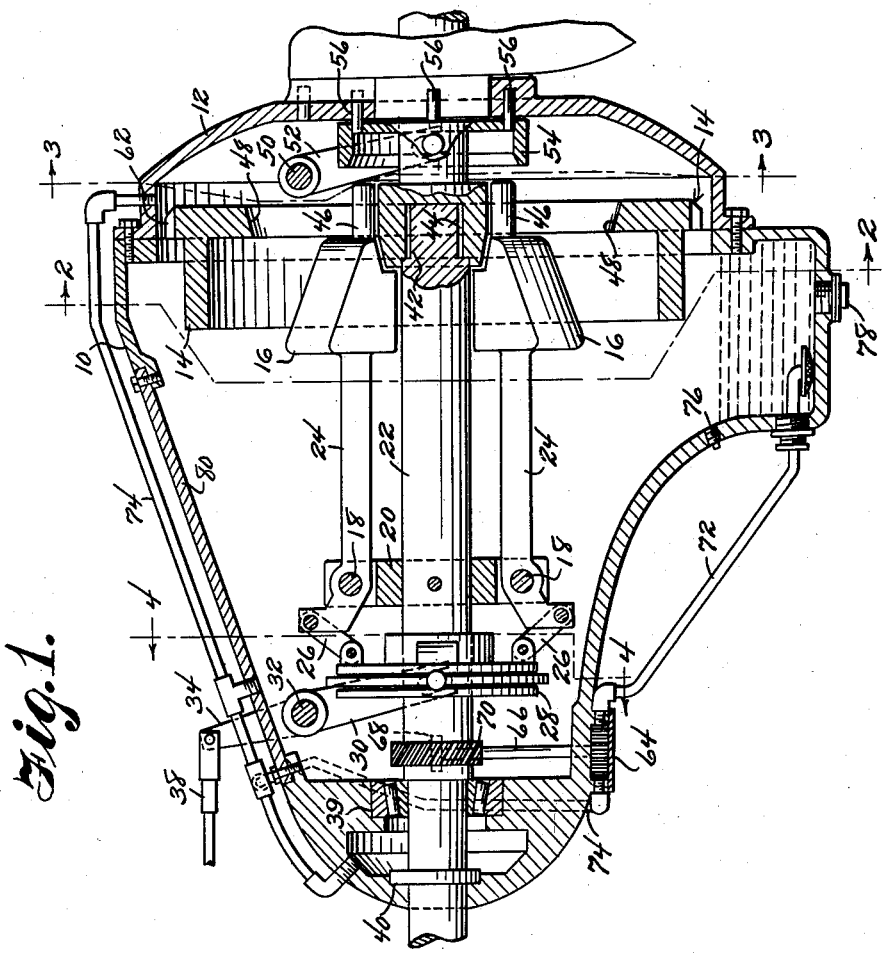
Figure 1 is a longitudinal sectional view of an embodiment of the invention.

Referring now to the drawings, the numeral 10 designates the control unit, housing which is bolted to the housing 12 of the flywheel 14 in place of the usual clutch housing, there being no clutch necessary when this unit is used in conjunction with an adjustable bladed turbine wheel device. However, the control unit can be bolted onto the forward end of the transmission which it controls, or both the transmission and the control unit may be mounted separately, with a universal joint on the shaft which connects them.

The action of the control unit depends upon the centrifugal force exerted by the governor weights 16 which are weighted on fulcrum pins 18, these pins being set in a pronged collar 20 which is shown in elevation in Figure 5. The pronged collar 20 is pressed on a shaft 22 which extends longitudinally of the control unit housing 10 and is connected at the rear end to the driving shaft of a transmission preferably through the medium of a universal joint, such connection not being shown.

The arms 24 which carry the weights 16 extend through and beyond the collar 20 and engage links 26 which are connected to a control collar 28 which is slidably mounted on the shaft 22. When the weights 16 are thrown outwardly by centrifugal force, the control collar 28 is pushed toward the rear and swings a control arm 30. The control arm is carried by a shaft 32, one end of which extends through the housing 10 and is equipped outside of the housing with a crank arm 34 and a crank arm 36.

Crank arm 34 engages, by means of a suitable connecting rod 38, the control arm of the turbine wheel device whose blade settings are to be determined by the control unit. Crank arm 36 is engaged by means of a suitable connecting rod, not shown, with a vacuum controlled piston which is controlled by the vacuum created in the intake manifold of the gasoline engine to which this unit is attached. This vacuum controlled piston is of the standard type in common use and is not a part of this invention.

In the event this unit is attached to a motor vehicle powered by a compression ignition engine where no vacuum is available, the vacuum controlled piston is substituted by an ordinary coil spring, one end of which is attached to crank arm 36 and the opposite end is attached to the foot brake pedal of the vehicle.

Industrial applications of this unit to compression ignition engines require that crank arm 36 be connected by a coil spring to the throttle lever of the engine or to a separate lever.

The shaft 22 is carried in a main bearing 39 at the rear of the housing 10 and an oil retaining washer 40 seals the shaft where it leaves the housing. The shaft 22 is provided with a spline 42 at its forward end which engages with a spline 44 in the hub of the flywheel 14.

The weights 16 of which there are four in number have projections 46 which snugly fit in slots 48 cut in the flywheel 14. See Figure 2. The twist of sudden starting and stopping is carried by the projections engaged through the flywheel 14 and is not transmitted to the pins 18 upon which the weights are carried.

Mounted at the forward end of the housing 10 is a shaft 50 having crank arms 52, see Figure 3, which engage a cup shaped collar 54. The collar is carried by pins 56, see Figure 1, these pins being free to slide back and forth in holes formed in the forward side of the flywheel housing and continued into part of the motor block.

A lever 58, see Figures 2 and 3, is connected to the shaft 50 outside of the housing 10 and is connected to the conventional emergency or hand brake lever of the vehicle. In case of industrial application this may be a separate lever. When the hand brake lever is set, the collar 54 is pushed over the projection 46 of the weights 16 and the weights are held against the shaft 22 regardless of the speed of the engine so that the control unit and its associated turbine wheel device are in neutral. The conventional starter of the motor is arranged in an extension 60 of the housing 10, see Figure 2, to engage the toothed rim 62 of the flywheel 14.

Toward the rear of the housing 10 between the collar 28 and the main bearing 39 is an oil pump 64 which is bolted on the underneath side of the housing 10 and is easily accessible. The pump 64 being operated by the vertical shaft 66 having a gear 68 thereon meshing with the gear 70 on the shaft 22. An intake pipe 72, picks up oil in the bottom of the housing 10 and the pump supplies the oil through an outlet pipe 74 to the main bearing 39, the control collar 28, projection 46 and the cup shaped collar 54. The pronged collar 20 and the parts carried thereby are splash lubricated by the supply from the control collar 28.

The oil level in the housing 10 is determined when filling by an oil level plug 76. A drain plug 78 is disposed on the bottom of the housing 10 and there is an oil filler plug not shown disposed at a convenient point above the level of the shaft 22.

Since little pressure is required in this unit the pump 64 is of the low speed, low pressure type, also the shape and arrangement of the various parts of the unit prevent the weights 16 from splashing in the oil when they are at or near the outside orbit of their travel. It should be pointed out that should any of the linking mechanism become loose or broken, the rim of the flywheel 14 is in such position as to catch the weights 16 before any further damage can be done. An inspection plate 80 is removably secured to the top of the housing and permits adjustment or repair to the governor weight assembly.

After the foregoing detailed description of the component parts of this apparatus, a brief description of its functioning under actual working conditions may now be in order. If careful attention has been paid to the nomenclature used in the previous descriptions, the numerical designation of each part may now be left off entirely.

The following description is based upon the assumption that the control unit is attached to a motor vehicle, although its action in industrial applications is essentially the same.

While the vehicle is stationary, the engine idling and the conventional hand brake for the vehicle wheels is applied, the cup shaped collar will be moved by the hand brake linkage to a position where it is fitted snugly over the projections on the governor weights which extend thru the flywheel. Thus if the throttle is opened while the hand brake is applied, this collar holds the weights snugly against the shaft and there is no action by the apparatus to be imparted to its associated turbine wheel device.

The weights however will lie against the shaft while the engine is idling, whether or not the hand brake lever is set and the collar is in place or not, due to the pull of the vacuum controlled piston connected to the crank arm 36. The vacuum which actuates this piston is at a maximum while the throttle is closed. In the case of a compression ignition engine, this condition applies while the engine is idling and the foot brake lever is depressed.

When the hand brake of the vehicle is released and the throttle opened, the vacuum controlled piston releases crank arm 36 and the centrifugal force created by the increased speed causes the weights to fly outward. This action causes the collar 28 to slide toward the rear of the unit, carrying with it control arm 30 and the shaft 32 upon which this arm is mounted.

The turning of shaft 32 causes crank arm 34 to move thru an arc, this movement being used, by means of a suitable connecting rod, to change the setting of the blades of the turbine wheel device or transmission, which is controlled by this apparatus.

Now it can readily be seen that the action of this unit is to apply more and more pressure to the control arm of the turbine wheel device to which it is attached, as the speed of the engine is increased. When this device is so designed that the ratio between the driving and driven members is changed by a movement of its control arm, then this control arm may be connected by direct linkage to the crank arm 34 of this control apparatus.

Thus it can be seen that the speed ratio of the crank shaft of the engine and the driven shaft of the turbine wheel device used as a transmission and controlled by this unit may always be such as to place a predetermined load upon the engine. This load varies directly as the speed of the engine varies, and is in no wise dependent upon the manual shifting of gears. The desired load for the engine may be selected by the manufacturer and is adjustable within any desired limits by changing the length of arms 24, the size of weights 16 or a combination of these changes.

It should be pointed out here that weights 16 may be slidably attached to arms 24 and held in place by self-locking bolts. Such an arrangement makes it possible for field servicemen to quickly change the load which the unit will place upon the engine.

From the above description it is thought that the construction and operation of the invention will be fully undersood without further explanation.

Having thus described the invention what is claimed as new and desired to be secured by Letters Patents is:

A device of the character described, comprising a driven shaft, a housing for the shaft, a flywheel, a hub for said flywheel splined to the end of said shaft, weights having respective arms, extending along the shaft at idling speed, said weights having projections slidably engaged in openings in the flywheel, a control collar slidably mounted on the shaft, a pronged collar fixed to the shaft pivotally mounting the arms of the weights, links connected to the arms of the weights and to the control collar, a pivot control arm connected to the control collar adapted to be connected to the control rod of a transmission, means for holding the weights stationary at will against movement by centrifugal force, said means comprising a cup shaped collar slidably secured to the hub of said flywheel, and adapted to be axially movable along said shaft to receive said projections and hold the projections and the weights against movement by centrifugal force and manually operable means for shifting the cup shaped collar into and out of operative position.

JOSEPH R. HORTON.

REFERENCES CITED

The following references are of record in the file of this patent:

UNITED STATES PATENTS

| Number | Name | Date |
|---|---|---|
| 1,104,119 | Horning | July 21, 1914 |
| 2,229,681 | Sorensen | Jan. 28, 1941 |
| 2,247,492 | Hale | July 1, 1941 |
| 2,270,306 | Kalin | Jan. 20, 1942 |